US012678371B2

(12) United States Patent
Rundlett et al.

(10) Patent No.: US 12,678,371 B2
(45) Date of Patent: Jul. 14, 2026

(54) VIAL ADAPTER WITH UNIVERSAL CONNECTION

(71) Applicant: Becton, Dickinson and Company, Franklin Lakes, NJ (US)

(72) Inventors: Erik Rundlett, Brea, CA (US); Narsi Reddy Sanikommu, Kanigiri (IN); Prashant Dalavi, Belgaum (IN); Arvind Kumar Mishra, Jhansi (IN); Akash Kaloji, Pune (IN)

(73) Assignee: Becton, Dickinson and Company, Franklin Lakes, NJ (US)

( * ) Notice: Subject to any disclaimer, the term of this patent is extended or adjusted under 35 U.S.C. 154(b) by 340 days.

(21) Appl. No.: 18/477,847

(22) Filed: Sep. 29, 2023

(65) Prior Publication Data

US 2025/0107969 A1 Apr. 3, 2025

(51) Int. Cl.
*A61J 1/20* (2006.01)

(52) U.S. Cl.
CPC ............ *A61J 1/201* (2015.05); *A61J 1/2048* (2015.05); *A61J 1/2096* (2013.01)

(58) Field of Classification Search
CPC ...... A61J 1/2096; A61J 1/2048; A61J 1/2055; A61J 1/2089; A61J 1/2065; A61J 1/2075; A61J 1/2013; A61J 1/201; A61J 1/20
See application file for complete search history.

(56) References Cited

U.S. PATENT DOCUMENTS

| | | | | |
|---|---|---|---|---|
| 9,919,826 | B2 | 3/2018 | Ivosevic et al. | |
| 11,103,641 | B1 * | 8/2021 | Doubet | A61M 5/2455 |
| 2009/0120934 | A1 * | 5/2009 | Domkowski | A61J 1/1425 220/253 |
| 2014/0014210 | A1 * | 1/2014 | Cederschiold | A61M 5/3286 53/381.2 |
| 2015/0084252 | A1 | 3/2015 | Dallman | |
| 2018/0200147 | A1 | 7/2018 | Sanders | |
| 2021/0331824 | A1 | 10/2021 | Ivosevic et al. | |

FOREIGN PATENT DOCUMENTS

WO 2012150587 A1 11/2012

* cited by examiner

*Primary Examiner* — Philip R Wiest
*Assistant Examiner* — Seth Han
(74) *Attorney, Agent, or Firm* — The Webb Law Firm

(57) ABSTRACT

A vial adapter includes a body having a component connection interface, a piercing member having a first end connected to the body and a second end positioned opposite the first end, with the piercing member and the body defining a fluid passageway in fluid communication with the component connection interface, and a vial securing member extending from the body. The vial securing member is configured to secure the body to a vial. The vial securing member is moveable between a first position where the vial securing member defines a first length and a first width and a second position where the vial securing member has a second length and a second width, where the first length is larger than the first width, the first length is larger than the second length, and the second width is larger than the first width.

17 Claims, 7 Drawing Sheets

VIAL ADAPTER WITH UNIVERSAL CONNECTION

BACKGROUND OF THE INVENTION

Field of the Invention

The present invention relates to a vial adapter with a universal vial connection.

Description of Related Art

Health care providers reconstituting, transporting, and administering hazardous drugs, such as chemotherapeutic medication, can put health care providers at risk of exposure to these medications and present a hazard in the health care environment. Unintentional chemotherapy exposure can affect the nervous system, impair the reproductive system, and bring an increased risk of developing blood cancers in the future. Some drugs must be dissolved or diluted before they are administered, which involves transferring a solvent from one container to a sealed vial containing the drug in powder or liquid form. Drugs may be inadvertently released into the atmosphere in gas form or by way of aerosolization, during the withdrawal of the medication from the vial if any pressure differential between the interior of the vial and the surrounding atmosphere exists. In order to reduce the risk of health care providers being exposed to toxic drugs, the transfer of these drugs is accomplished by utilizing a closed system transfer device or system.

Vial adapters for accessing the vial or container utilize a piercing member that penetrates the sealing member of the container and defines an opening at a distal end of the piercing member. Typically, after the piercing member accesses the vial, the vial is inverted to withdraw the medicament from the container. Such devices may also include a pressure equalization arrangement to prevent pressurization of the container or a vacuum being created within the container, which can deform the container and increase the risk of the medication entering the surrounding environment. Prior to withdrawing liquid medication from the container, a syringe, which may be attached to a syringe adapter, may be filled with air by pulling back on the plunger of the syringe. The air within the syringe is pushed into the container via the vial adapter, which expands the pressure equalization arrangement. The liquid medication is then withdrawn with the air in the pressure equalization arrangement replacing the fluid within the container to maintain a pressure within the container.

The medication containers, which are typically vials, have various sizes and dimensions. As the vial adapter is positioned over the closure of vial and the vials are provided with various size closures, various size vial adapters need to be provided to accommodate the different size vials. Providing various size vial adapters increases the complexity of inventory management and workflow for medical providers.

SUMMARY OF THE INVENTION

In one aspect or embodiment, a vial adapter includes a body having a component connection interface configured to engage a connection interface of a mating component, a piercing member having a first end connected to the body and a second end positioned opposite the first end, with the piercing member and the body defining a fluid passageway in fluid communication with the component connection interface, and a vial securing member extending from the body. The vial securing member is configured to secure the body to a vial, with the vial securing member moveable between a first position where the vial securing member defines a first length and a first width and a second position where the vial securing member has a second length and a second width. The first length is larger than the first width, the first length is larger than the second length, and the second width is larger than the first width.

The vial adapter may further include a pressure equalization assembly having an equalization housing and an expandable member, with the equalization housing and the expandable member defining a space configured to expand from a first volume to a second volume larger than the first volume. The equalization housing may define an equalization opening in fluid communication with the space, where the piercing member defines a pressure equalization passageway in fluid communication with the equalization opening.

The vial securing member may be ring-shaped. The vial securing member may be flexible and configured to be deformed by a healthcare worker to move between the first position and the second position. The vial securing member may define an ellipse, with a major axis of the ellipse corresponding to the first and second lengths and the minor axis of the ellipse corresponding to the first and second widths. The vial securing member may be connected to the body by first and second arms. The vial securing member may be axially spaced from the body.

The vial adapter may further include a lock member configured to lock the vial securing member in the second position. The vial securing member may define first and second openings, with the lock member extending through the first and second openings of the vial securing member. The lock member may be a zip tie.

The component connection interface may include a membrane and may be configured to mate with a syringe adapter. The body and the equalization housing may be formed separately.

In a further aspect or embodiment, a vial adapter includes a body having a component connection interface configured to engage a connection interface of a mating component, a piercing member having a first end connected to the body and a second end positioned opposite the first end, with the piercing member and the body defining a fluid passageway in fluid communication with the component connection interface, and a vial securing member extending from the body, with the vial securing member configured to secure the body to a vial. The vial securing member is hypocycloid-shaped and defines curved sides, with the curved sides of the vial securing member configured to be radially expandable to receive a first vial having a first diameter and second vial having a second diameter. The second diameter is larger than the first diameter.

DETAILED DESCRIPTION

Figure 1:
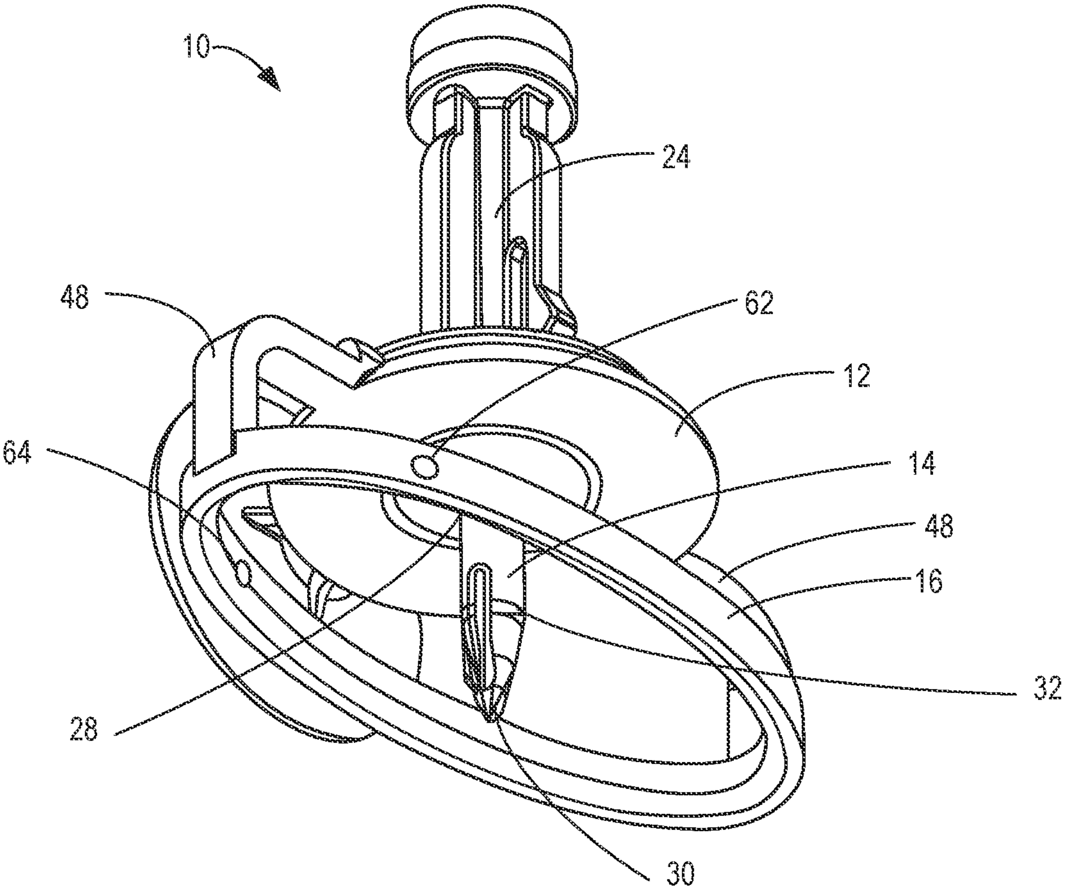
FIG. 1 is a perspective view of a vial adapter according to one aspect or embodiment of the present application.

For purposes of the description hereinafter, the terms such as "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Further, it is to be understood that the invention may assume various alternative variations and step sequences, except where expressly specified to the contrary.

Referring to FIGS. 1-7, according to one aspect or embodiment, a vial adapter 10 includes a body 12, a piercing member 14, and a vial securing member 16. The vial adapter 10 is a closed system transfer device component and utilized to facilitate transfer of medication from a vial to another container or component, such as a syringe connected to a syringe adapter (not shown), while preventing release of medication within a vial 18 to the surrounding environment. The vial 18 may be a container, such as a glass or polymer container, having a pierceable closure 20 and neck 22, although the vial 18 may be any other suitable container typically utilized in transfer of medications.

Figure 6:
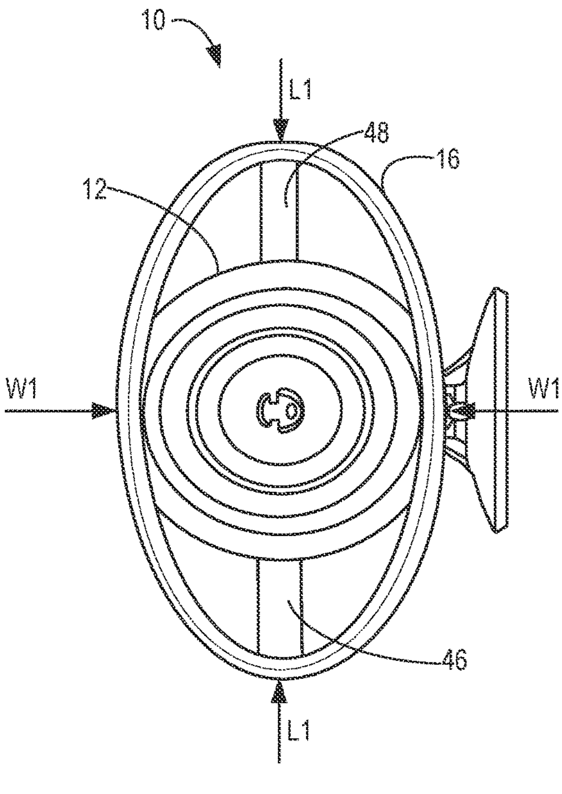
FIG. 6 is a bottom view of the vial adapter of FIG. 1, showing a step of the vial adapter being connected to a vial.
Figure 7:
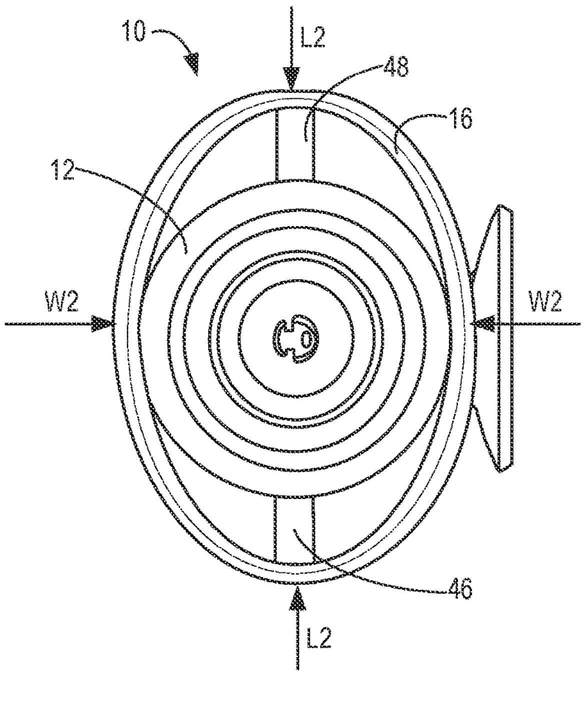
FIG. 7 is a bottom view of the vial adapter of FIG. 1, showing a further step of the vial adapter being connected to a vial.

Referring again to FIGS. 1-7, the body 12 has a component connection interface 24 configured to engage a connection interface of a mating component, such as a syringe adapter. In one aspect or embodiment, the component connection interface 24 includes a membrane 26 and is configured to mate with a syringe adapter. The component connection interface 24 may be the same and operate in the same manner as the connection interface shown in FIGS. 20 and 21 of U.S. Patent Application Publication No. 2018/0200147. The piercing member 14 has a first end 28 connected to the body 12 and a second end 30 positioned opposite the first end 28, with the piercing member 14 and the body 12 defining a fluid passageway 32 in fluid communication with the component connection interface 24. In one aspect or embodiment, at least a portion of the piercing member 14 is covered by a retractable sleeve (not shown). The retractable sleeve may be the same as the retractable sleeve shown and described in U.S. Pat. No. 9,919,826. The vial securing member 16 extends from the body 12, with the vial securing member 16 configured to secure the body 12 to the vial 18. As shown in FIGS. 6 and 7, the vial securing member 16 is moveable between a first position (as shown in FIG. 6) where the vial securing member 16 defines a first length L1 and a first width W1 and a second position (as shown in FIG. 7) where the vial securing member 16 has a second length L2 and a second width W2. The first length L1 is larger than the first width W1, the first length L1 is larger than the second length L2, and the second width W2 is larger than the first width W1. In one aspect or embodiment, the first length L1 to first width W1 ratio is between 2.0-3.0. In one aspect or embodiment, the first length L1 to first width W1 ratio is between 2.0-2.5. In one aspect or embodiment, the first length L1 to first width W1 ratio is 2.14.

In one aspect or embodiment, the vial securing member 16 is configured to be grasped by a healthcare worker and deflected to move the vial securing member 16 from the first position (as shown in FIG. 6) to the second position (as shown in FIG. 7) such that the vial securing member 16 can receive vials having various sizes and dimensions. In other words, the vial securing member 16 can be deflected or opened to the extent necessary to allow the vial securing member 16 to receive and secure the vial adapter 10 to the vial 18. Due to the resiliency of the vial securing member 16, the vial securing member 16 is configured to return to the first position such that the vial securing member 16 is positioned under the closure 20 of the vial 18 at the neck 22 of the vial 18 thereby securing the vial adapter 10 to the vial 18. In one aspect or embodiment, the vial securing member 16 is configured to provide 15N of clamping force to secure the vial adapter 10 to the vial 18. In one aspect or embodiment, the vial securing member 16 is configured to provide 20N of clamping force to secure the vial adapter 10 to the vial 18. In one aspect or embodiment, the vial securing member 16 has a thickness of 1.6 mm or 2.0 mm to provide 15N or 20N of clamping force, respectively.

Figure 2A:
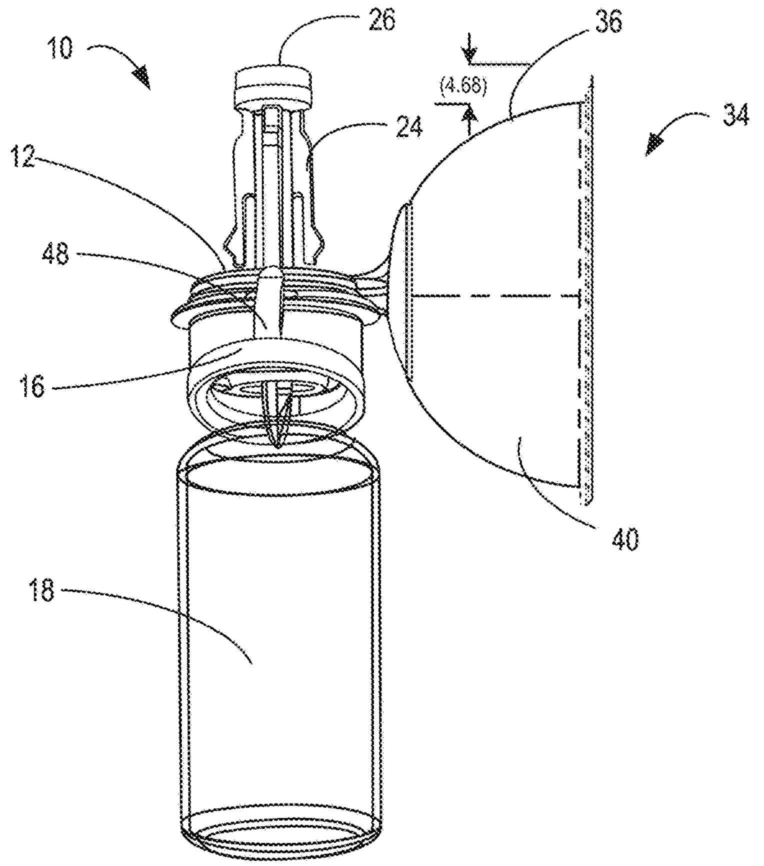
FIG. 2A is a perspective view of the vial adapter of FIG. 1, showing the vial adapter connected to a vial.
Figure 2B:
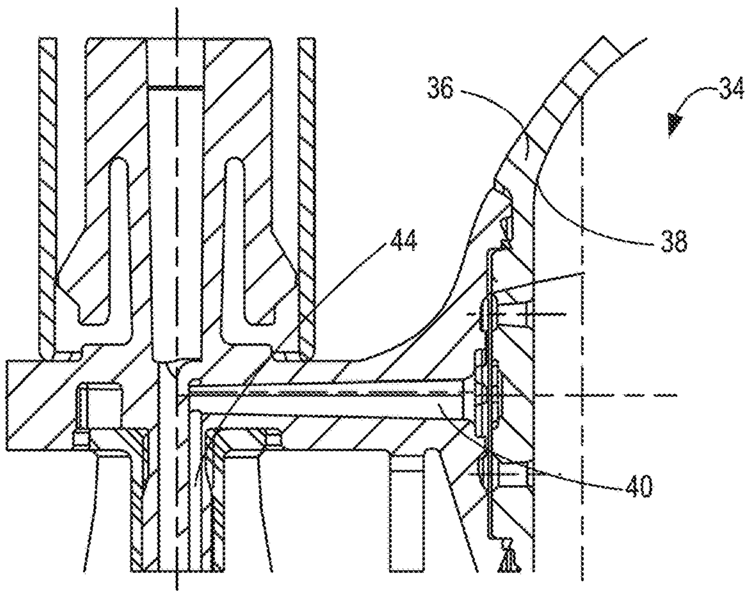
FIG. 2B is a partial cross-sectional view of the vial adapter of FIG. 1.
Figure 3:
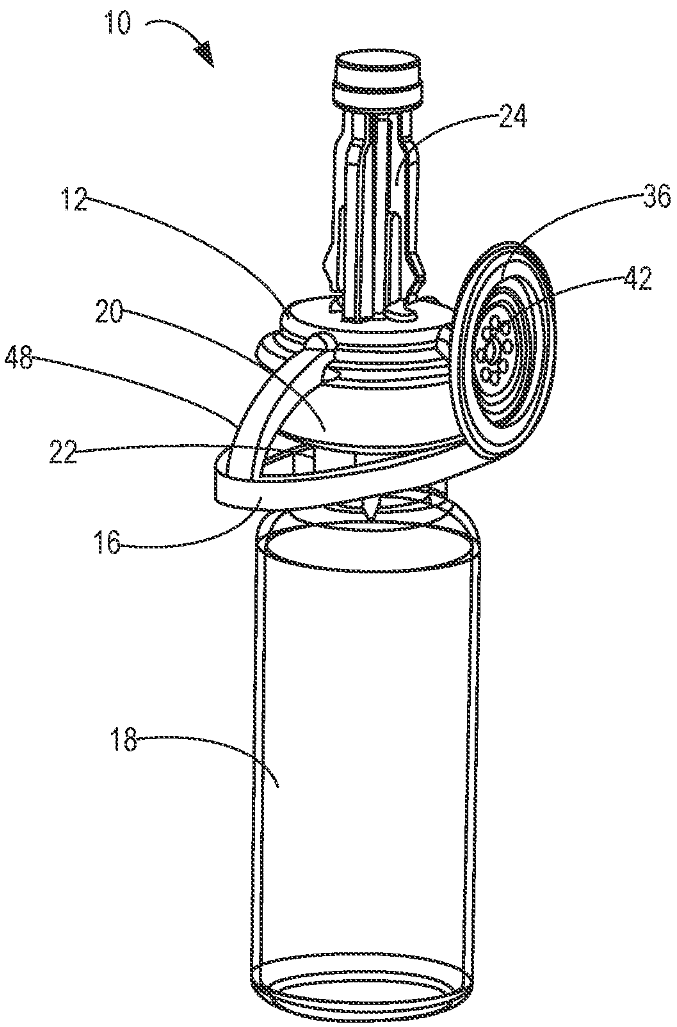
FIG. 3 is a perspective view of the vial adapter of FIG. 1, showing the vial adapter connected to a vial.
Figure 4:
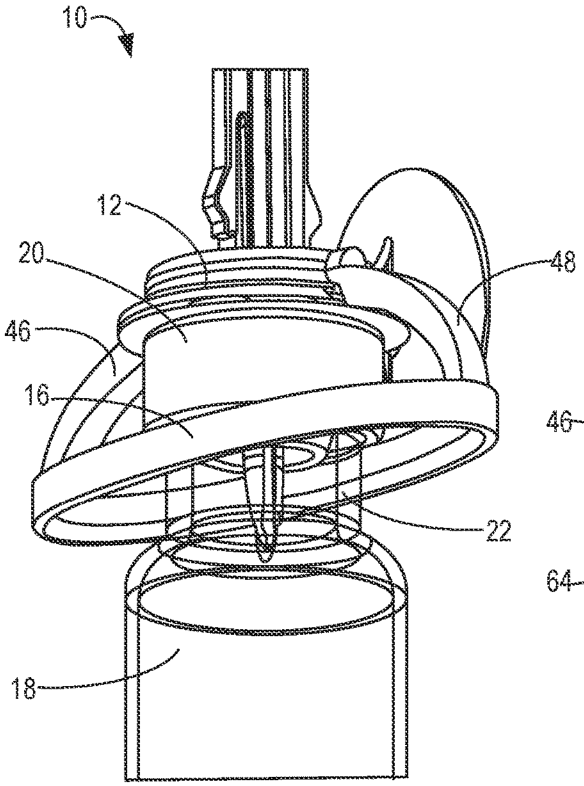
FIG. 4 is a partial perspective view of the vial adapter of FIG. 1, showing the vial adapter connected to a vial.

Referring to FIGS. 2A and 2B, in some aspects or embodiments, the vial adapter 10 further includes a pressure equalization assembly 34 having an equalization housing 36 and an expandable member 38, with the equalization housing 36 and the expandable member 38 defining a space 40 configured to expand from a first volume to a second volume larger than the first volume. In some aspects or embodiments, the expandable member 38 is a thin film attached to the equalization housing 36 that is configured to expand and contract. The equalization housing 36 defines an equalization opening 42 in fluid communication with the space 40 and the piercing member 14 defines a pressure equalization passageway 44 in fluid communication with the equalization opening 42. The pressure equalization assembly 34 is configured to equalize the pressure within the vial 18 during fluid transfer by the use of the pressure equalization passageway 44, the equalization opening 42, and the expandable member 38. The pressure equalization passageway 44 is in fluid communication with the space 40 such that air or fluid introduced into the vial 18 using the vial adapter 10 will displace the air within the vial 18 and expand the expandable member 38 from the first volume to the second volume. In particular, during use of the vial adapter 10, the pressure equalization assembly 34 is utilized to regulate the pressure within the vial 18 and contain the medication and any vapor thereof within the vial adapter 10 and within the vial 18.

Referring again to FIGS. 1-7, the vial securing member 16 is ring-shaped, although other suitable shapes, such as a plurality of arcuate spaced-apart segments, may be utilized.

As noted above, the vial securing member 16 is flexible and configured to be deformed by a healthcare worker to move between the first position and the second position. The flexibility of the vial securing member 16 may be provided by a material of the vial securing member, such as a polymer, and/or the shape and dimensions of the vial securing member. In one aspect or embodiment, the vial securing member 16 is formed from a polymer, such as a polypropylene homopolymer, and in particular may be Bormed™ HD850MO polymer commercially available from Borealis Group. In one aspect or embodiment, and as shown, the vial securing member 16 defines an ellipse, with a major axis of the ellipse corresponding to the first and second lengths L1, L2 and the minor axis of the ellipse corresponding to the first and second widths W1, W2. The vial securing member 16 is connected to the body 12 by first and second arms 46, 48 positioned at opposite ends of the vial securing member 16, although other suitable arrangements may be utilized. The vial securing member 16 is axially spaced from the body 12, although other suitable arrangements may be utilized.

In one aspect or embodiment, a method of utilizing the vial adapter 10 shown in FIGS. 1-7 includes: squeezing the vial securing member 16 of the vial adapter 10 to move the vial securing member 16 from the first position to the second position; while holding the vial securing member 16 to maintain the vial securing member 16 in the second position, pushing the vial adapter 10 onto the vial 18 such that the piercing member 14 is positioned within the vial 18 and the body 12 of the vial adapter 10 engages the vial 18; and releasing the vial securing member 16 such that the vial securing member 16 returns to the first position, with the vial securing member 16 positioned beneath the closure 20 of the vial 18 to secure the vial adapter 10 to the vial 18.

Figure 5:
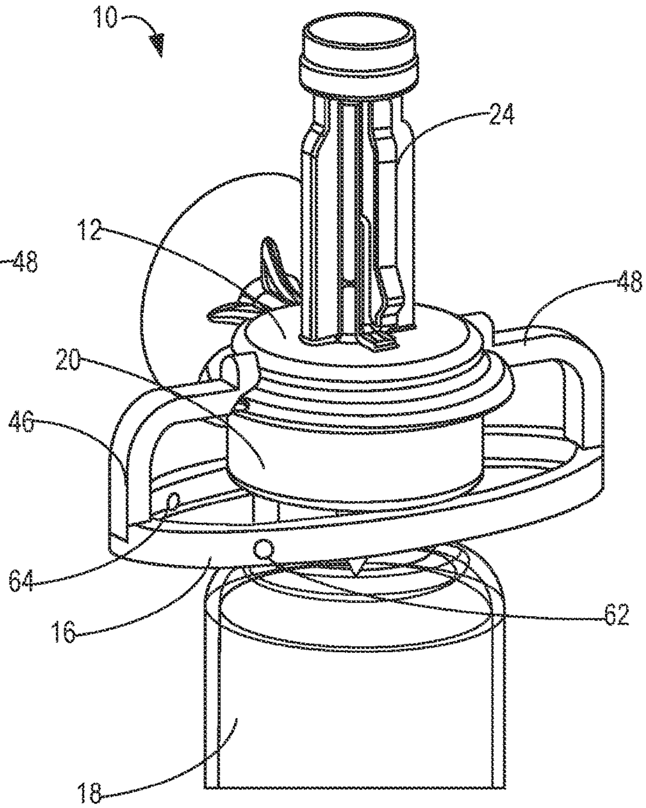
FIG. 5 is a partial perspective view of the vial adapter of FIG. 1, showing the vial adapter connected to a vial.
Figure 8:
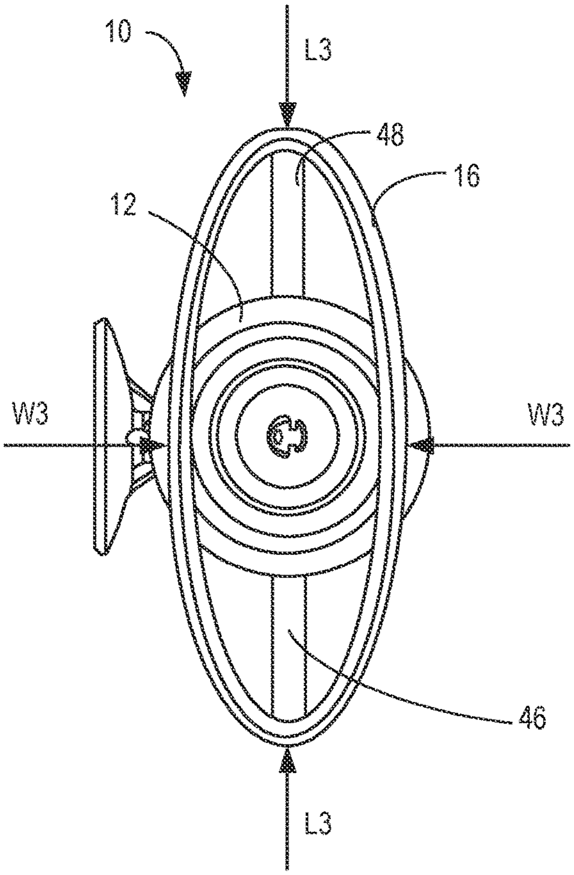
FIG. 8 is a bottom view of the vial adapter of FIG. 1, showing the vial adapter connected to a vial.
Figure 9:
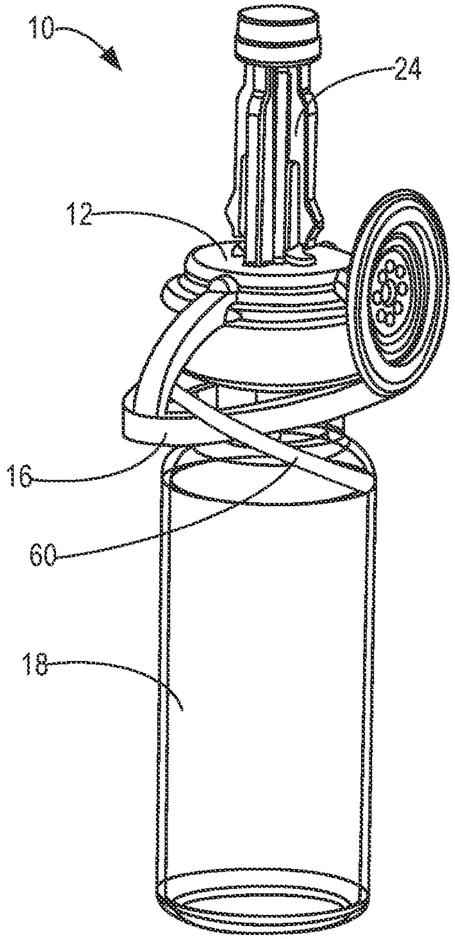
FIG. 9 is a bottom view of the vial adapter of FIG. 1, showing the vial adapter connected to a vial with a securing member.

Referring to FIGS. 5, 8, and 9, in some aspects or embodiments, the vial adapter further includes a lock member 60 configured to lock the vial securing member 16 in the second position. In some aspects or embodiments, the lock member 60 is utilized to move the vial securing member 16 to a third position (as shown in FIG. 8) after the vial adapter 10 is connected to the vial 18, where the vial securing member 16 has a third length L3 and a third width W3. The third width W3 is smaller than the second width W2 and the third length L3 is larger than the second length L2. As shown in FIGS. 5 and 9, the vial securing member 16 may define first and second openings 62, 64, with the lock member 60 extending through the first and second openings 62, 64 of the vial securing member 16. In one aspect or embodiment, the lock member 60 is a zip tie, although other suitable fasteners or arrangements may be utilized. The lock member 60 is configured to further tighten the vial securing member 16 and prevent any loosening or opening up of the vial securing member 16 once the lock member 60 has been secured, such as by pulling an end of the lock member 60.

Figure 10:
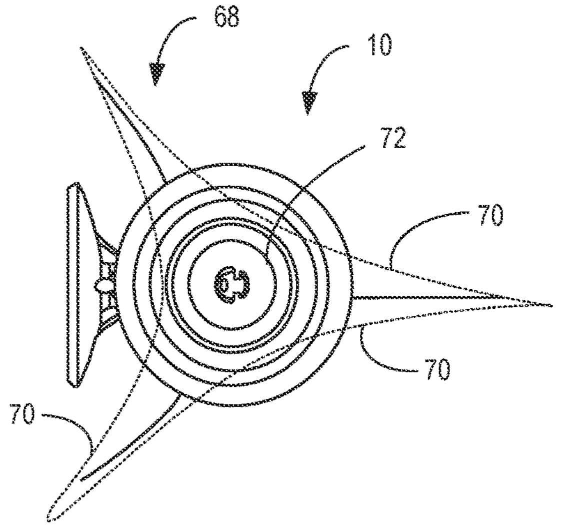
FIG. 10 is a bottom view of a vial adapter according to a further aspect or embodiment, showing the vial adapter secured to a first size vial.
Figure 11:
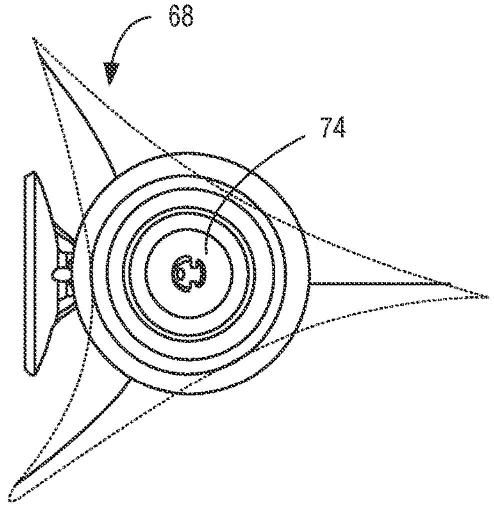
FIG. 11 is a bottom view of the vial adapter of FIG. 10, showing the vial adapter secured to a second size vial.
Figure 12:
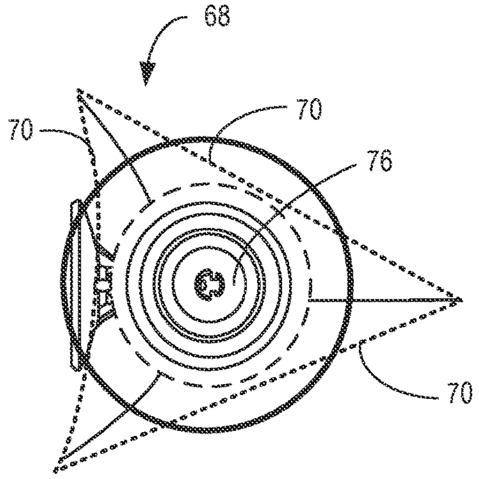
FIG. 12 is a bottom view of the vial adapter of FIG. 10, showing the vial adapter secured to a third size vial.

Referring to FIGS. 10-12, in a further aspect or embodiment, the vial adapter 10 is the same as shown in FIGS. 1-7 and described above except the vial adapter 10 includes a vial securing member 68 that is hypocycloid-shaped and defines curved sides 70. The curved sides 70 of the vial securing member 68 are configured to be radially expandable to receive a first vial 72 having a first diameter and second vial 74 having a second diameter, where the second diameter is larger than the first diameter. The vial securing member 68 can also receive and secure the vial adapter 10 to a third vial 76 having a third diameter, where the third diameter is smaller than the first diameter. In other words, the hypocycloid shape of the vial securing member 68 is configured to allow the vial securing member 68 to be biased or deflected from a closed position to an open position to the extent necessary to accommodate different size vials and subsequently returning to an unbiased position with the vial securing member 68 positioned beneath the closure 20 of the vial 18 to secure the vial adapter 10 to the vial 18.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims. To the extent possible, one or more features of any aspect or embodiment discussed above can be combined with one or more features of any other aspect or embodiment.

The invention claimed is:

1. A vial adapter comprising:

a body having a component connection interface configured to engage a connection interface of a mating component;

a piercing member having a first end connected to the body and a second end positioned opposite the first end, the piercing member and the body defining a fluid passageway in fluid communication with the component connection interface;

a vial securing member extending from the body, the vial securing member configured to secure the body to a vial, the vial securing member is moveable between a first position where the vial securing member defines a first length and a first width and a second position where the vial securing member has a second length and a second width, wherein the first length is larger than the first width, the first length is larger than the second length, and the second width is larger than the first width; and a lock member configured to lock the vial securing member in the second position.

2. The vial adapter of claim 1, further comprising a pressure equalization assembly having an equalization housing and an expandable member, the equalization housing and the expandable member defining a space configured to expand from a first volume to a second volume larger than the first volume, the equalization housing defining an equalization opening in fluid communication with the space, wherein the piercing member defines a pressure equalization passageway in fluid communication with the equalization opening.

3. The vial adapter of claim 1, wherein the vial securing member is ring-shaped.

4. The vial adapter of claim 1, wherein the vial securing member is flexible and configured to be deformed by a healthcare worker to move between the first position and the second position.

5. The vial adapter of claim 1, wherein the vial securing member defines an ellipse, with a major axis of the ellipse corresponding to the first and second lengths and the minor axis of the ellipse corresponding to the first and second widths.

6. The vial adapter of claim 1, wherein the vial securing member is connected to the body by first and second arms.

7. The vial adapter of claim 1, wherein the vial securing member is axially spaced from the body.

8. The vial adapter of claim 1, wherein the vial securing member defines first and second openings, the lock member extending through the first and second openings of the vial securing member.

9. The vial adapter of claim 8, wherein the lock member comprises a zip tie.

10. The vial adapter of claim 1, wherein the component connection interface comprises a membrane and is configured to mate with a syringe adapter.

11. The vial adapter of claim 2, wherein the body and the equalization housing are formed separately.

12. A vial adapter comprising:

a body having a component connection interface configured to engage a connection interface of a mating component;

a piercing member having a first end connected to the body and a second end positioned opposite the first end, the piercing member and the body defining a fluid passageway in fluid communication with the component connection interface; and a vial securing member extending from the body, the vial securing member configured to secure the body to a vial, the vial securing member is hypocycloid-shaped and defines curved sides, the curved sides of the vial securing member are configured to be radially expandable to receive a first vial having a first diameter and second vial having a second diameter, wherein the second diameter is larger than the first diameter.

13. The vial adapter of claim 12, further comprising a pressure equalization assembly having an equalization housing and an expandable member, the equalization housing and the expandable member defining a space configured to expand from a first volume to a second volume larger than the first volume, the equalization housing defining an equalization opening in fluid communication with the space, wherein the piercing member defines a pressure equalization passageway in fluid communication with the equalization opening.

14. The vial adapter of claim 12, wherein the vial securing member is flexible and configured to be deformed by a healthcare worker to move between the first position and the second position.

15. The vial adapter of claim 12, further comprising a lock member configured to lock the vial securing member in the second position.

16. The vial adapter of claim 15, wherein the vial securing member defines first and second openings, the lock member extending through the first and second openings of the vial securing member.

17. The vial adapter of claim 15, wherein the lock member comprises a zip tie.

* * * * *